(12) United States Patent
Mori

(10) Patent No.: US 7,445,283 B2
(45) Date of Patent: Nov. 4, 2008

(54) HEADREST HEIGHT ADJUSTING APPARATUS

(75) Inventor: Masatoshi Mori, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/684,256

(22) Filed: Mar. 9, 2007

(65) Prior Publication Data

US 2007/0216211 A1      Sep. 20, 2007

(30) Foreign Application Priority Data

Mar. 20, 2006   (JP)   ............... 2006-076443

(51) Int. Cl.
*B60N 2/427*   (2006.01)
*B60N 2/42*    (2006.01)
*B60N 2/48*    (2006.01)
*B60R 21/055*  (2006.01)
*B60R 21/013*  (2006.01)

(52) U.S. Cl. .................. 297/216.12; 297/410
(58) Field of Classification Search ............ 297/216.12, 297/410
See application file for complete search history.

(56) References Cited

U.S. PATENT DOCUMENTS

| | | | | |
|---|---|---|---|---|
| 5,669,666 A | * | 9/1997 | Lee | .............. 297/410 X |
| 5,918,940 A | * | 7/1999 | Wakamatsu et al. | .......... 297/410 |
| 5,975,637 A | * | 11/1999 | Geuss et al. | ......... 297/216.12 X |
| 6,390,558 B2 | * | 5/2002 | Fischer et al. | ............... 297/410 |
| 6,749,256 B1 | * | 6/2004 | Klier et al. | ............. 297/216.12 |
| 7,066,545 B2 | * | 6/2006 | Terada et al. | ................ 297/410 |
| 7,226,124 B2 | * | 6/2007 | Mori et al. | .............. 297/410 X |
| 2001/0013718 A1 | * | 8/2001 | Beck | .......................... 297/410 |
| 2005/0231018 A1 | | 10/2005 | Masatoshi et al. | |
| 2006/0103216 A1 | * | 5/2006 | Hoekstra et al. | ............ 297/410 |

FOREIGN PATENT DOCUMENTS

DE          43 25 996 A1      2/1995

* cited by examiner

Primary Examiner—Rodney B. White
(74) Attorney, Agent, or Firm—Oblon, Spivak, McClelland, Maier & Neustadt, P.C.

(57) ABSTRACT

A headrest height adjusting apparatus includes: a basal member attached to a seatback and supporting a driving member; a movable member linked to a headrest and lifted up and down relative to the basal member; a transmitting member transmitting a driving force of the driving member to the movable member and lifting up and down the headrest linked to the movable member. The transmitting member having a frangible portion that leads a collapse of the transmitting member against an impact applied in a vertical direction between the driving member and the movable member and absorbs energy of the impact.

10 Claims, 6 Drawing Sheets

Longitudinal Direction

FIG. 6
(a)
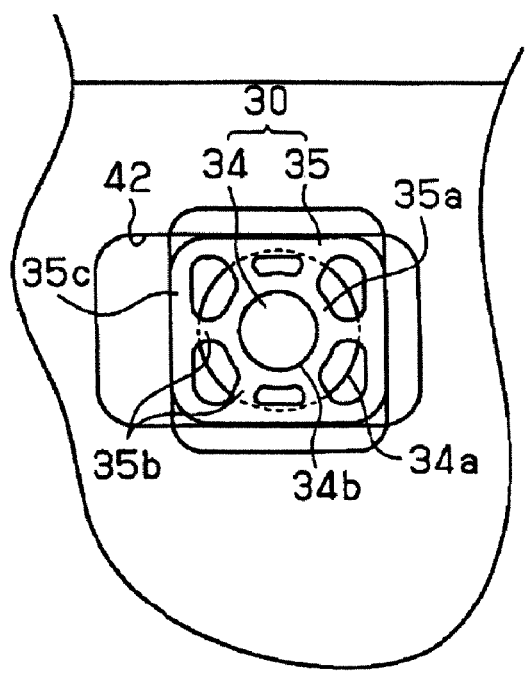
(b)
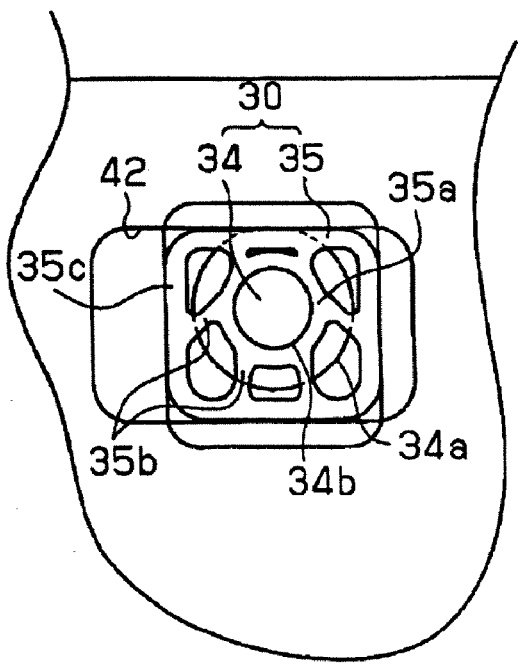

HEADREST HEIGHT ADJUSTING APPARATUS

CROSS REFERENCE TO RELATED APPLICATIONS

This application is based on and claims priority under 35 U.S.C. §119 with respect to Japanese Patent Application 2006-076443, filed on Mar. 20, 2006 the entire content of which is incorporated herein by reference.

FIELD OF THE INVENTION

The present invention relates to a headrest height adjusting apparatus.

BACKGROUND

DE4325996A1 (FIGS. 1, 2 and 3) discloses one of headrest height adjusting apparatuses that have been conventionally known. The headrest height adjusting apparatus includes: a basal member secured to a seatback; and a movable member connected to a headrest via stays. The basal member is firmly attached to the seatback by attachment hooks and supports a motor, which serves as a driving member, speed reduction gears and an output gear. The movable member is lifted up and down being guided by guiding portions of the basal member when driving force of the driving member is transmitted to the movable member, i.e., when rotational movement of the output gear (pinion) is transmitted to a rack integrally formed at the movable member. As a result, the headrest is lifted up and down as one unit with the movable member. Further, the headrest height adjusting apparatus has been reduced in weight since the basal member and the movable member are resin moldings.

Meanwhile, because the basal member and the movable member, which are main components of the headrest height adjusting apparatus, are made of resin, these two components are brittle or fragile especially for an impact. For example, when the apparatus bears an excessive impact in an up-and-down direction, for example in an event of a vehicle collision, the basal member or the movable member may be damaged and may not support the headrest any more.

Recent assessment trends have led to further dynamic requirement upgrades than before. In such circumstances, those headrest height adjusting apparatuses with the aforementioned conventional structure may not satisfy the dynamic requirements.

The present invention has been made in view of the above circumstances, and provides a headrest height adjusting apparatus that maintains the headrest appropriately against an impact and can be reduced in weight.

SUMMARY OF THE INVENTION

According to an aspect of the present invention, a headrest height adjusting apparatus includes: a basal member 13 attached to a seatback and supporting a driving member; a movable member linked to a headrest and lifted up and down relative to the basal member; a transmitting member transmitting a driving force of the driving member to the movable member and lifting up and down the headrest linked to the movable member. The transmitting member has a frangible portion that leads a collapse of the transmitting member in response to an impact applied in a vertical direction between the driving member and the movable member and absorbs energy of the impact.

BRIEF DESCRIPTION OF THE DRAWINGS

The foregoing and additional features and characteristics of the present invention will become more apparent from the following detailed description considered with reference to the accompanying drawings, wherein:

FIG. 6A is a front view illustrating an operation of a bush of the headrest height adjusting apparatus; and FIG. 6B is another front view illustrating the operation of the bush.

DETAILED DESCRIPTION

Embodiments of the present invention will be described below with reference to the attached drawings.

Figure 1:
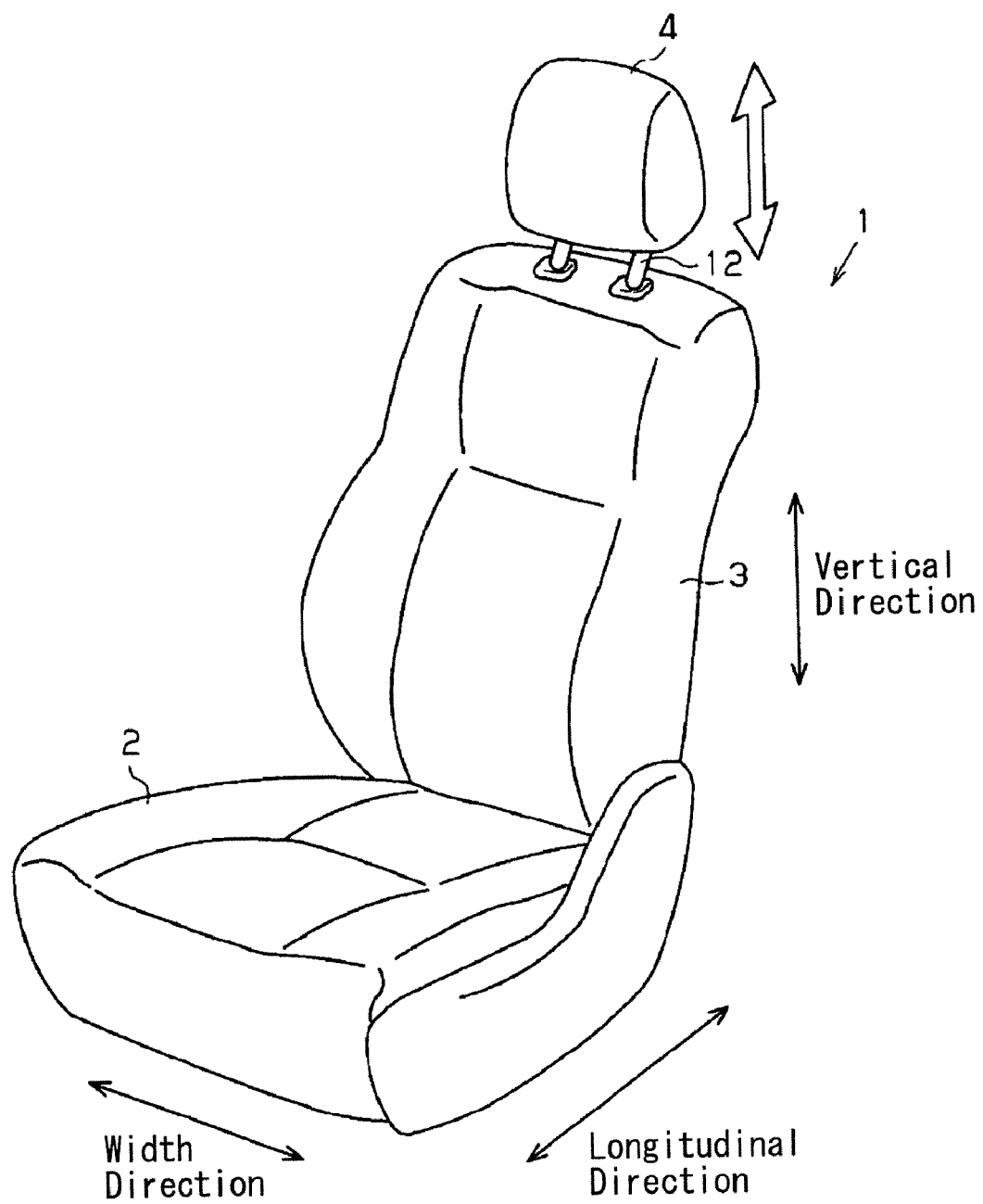
FIG. 1 is a perspective view illustrating a seat for a vehicle to which an embodiment of the present invention is applied.

Described below is an embodiment of the present invention with the attached drawings. FIG. 1 is a perspective view illustrating a seat 1 to which the embodiment of the present invention is applied. A seat cushion 2 is mounted on a floor (not illustrated) of the vehicle via a slide mechanism (not illustrated) so that the seat cushion 2 is slidably movable in a longitudinal direction of the vehicle. Here, a longitudinal direction of the vehicle corresponds to a front and rear direction of the vehicle. At a rear end of the seat cushion 2, there is a seatback 3, which supports a back of a seated occupant, being pivotably supported via a recliner (not illustrated). A headrest 4 is attached to an upper end of the seatback 3 so as to be lifted up and down, thus preventing the head of the occupant from snapping rearward.

Figure 2:
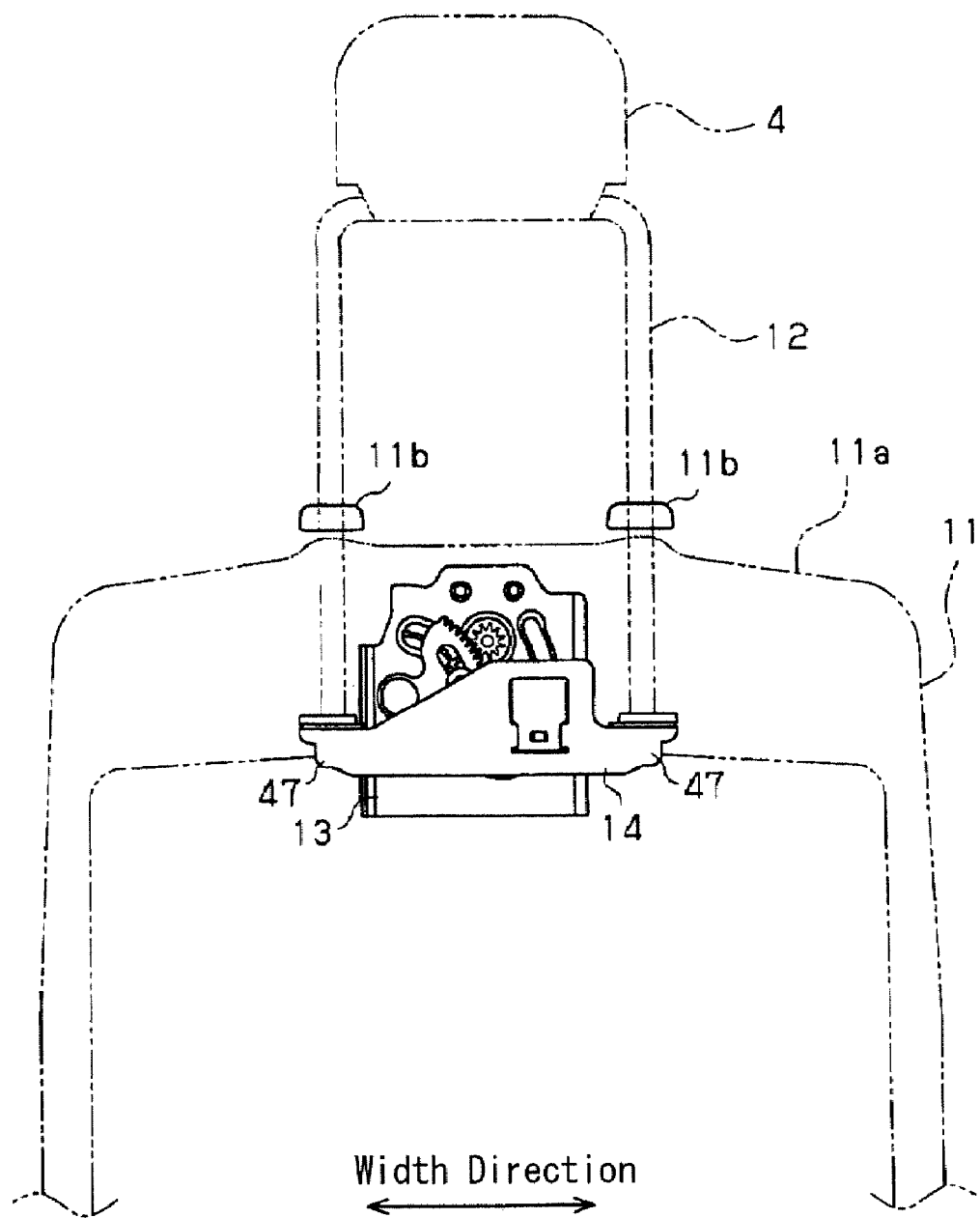
FIG. 2 is a front view illustrating the seat having a headrest height adjusting apparatus.

Next, described below is an interconnected structure of the seatback 3 and the headrest 4. As illustrated in FIG. 2, a seatback frame 11, structuring the seatback 3, exhibits an approximately reverse U-shaped structure having a frame portion 11a extending in a width direction of the vehicle. The frame portion 11a corresponds to an upper portion of the reverse U-shaped structure. Here, a width direction of the vehicle corresponds to a left and right direction of the vehicle. A pair of supports 11b is mounted to an upper surface in a width-directional central area of the frame portion 11a. Each support 11b is formed with circular-shaped opening arranged coaxially at upper side and at lower side. Here, an up-and-down direction corresponds to a vertical direction of the vehicle. The openings of the support 11b at the left side in FIG. 2 are spaced at the same distance (in the width direction) in parallel to the openings of the other support 11b at the right side therein, respectively. The axes of all openings of the supports 11b hence extend in the vertical direction of the headrest 4, i.e., in a direction in which the headrest 4 is lifted up and down vertically. A stay 12 is a metal bar having an outer diameter substantially identical to an inner diameter of each opening. The stay 12 is bent to exhibit an approximately reverse U-shaped structure and both ends thereof are inserted into the openings of the supports 11b so as to be movable in the up-and-down direction. The headrest 4 is firmly attached to an upper portion of the reverse U-shaped stay 12. That is, the headrest 4 is lifted up and down relative to the seatback frame 11 (seatback 3) in a manner that the stay 12 is guided and supported by the supports 11b.

A basal member 13 is fastened, with bolts-nuts joints, to a portion of the frame portion 11a under the width-directional area between the supports 11b. The basal member 13 is made of resin such as PBT (poly butylene terephthalate) and formed into a four-sided polygonal shape. A movable member 14 is connected to the basal member 13 so as to be lifted up and down. The movable member 14 is made of resin such as nylon 66 and formed into an approximately triangular shape. As described above, both ends of the stay 12 are inserted through the supports 11b and are integrated with both width-directional ends of the movable member 14. The movable member 14 is lifted up and down as one unit with the headrest 4, to which the movable member 14 is linked via the stay 12, in response to transmission of a driving force of a driving member, which is supported by the basal member 13, to the movable member 14.

Figure 5:
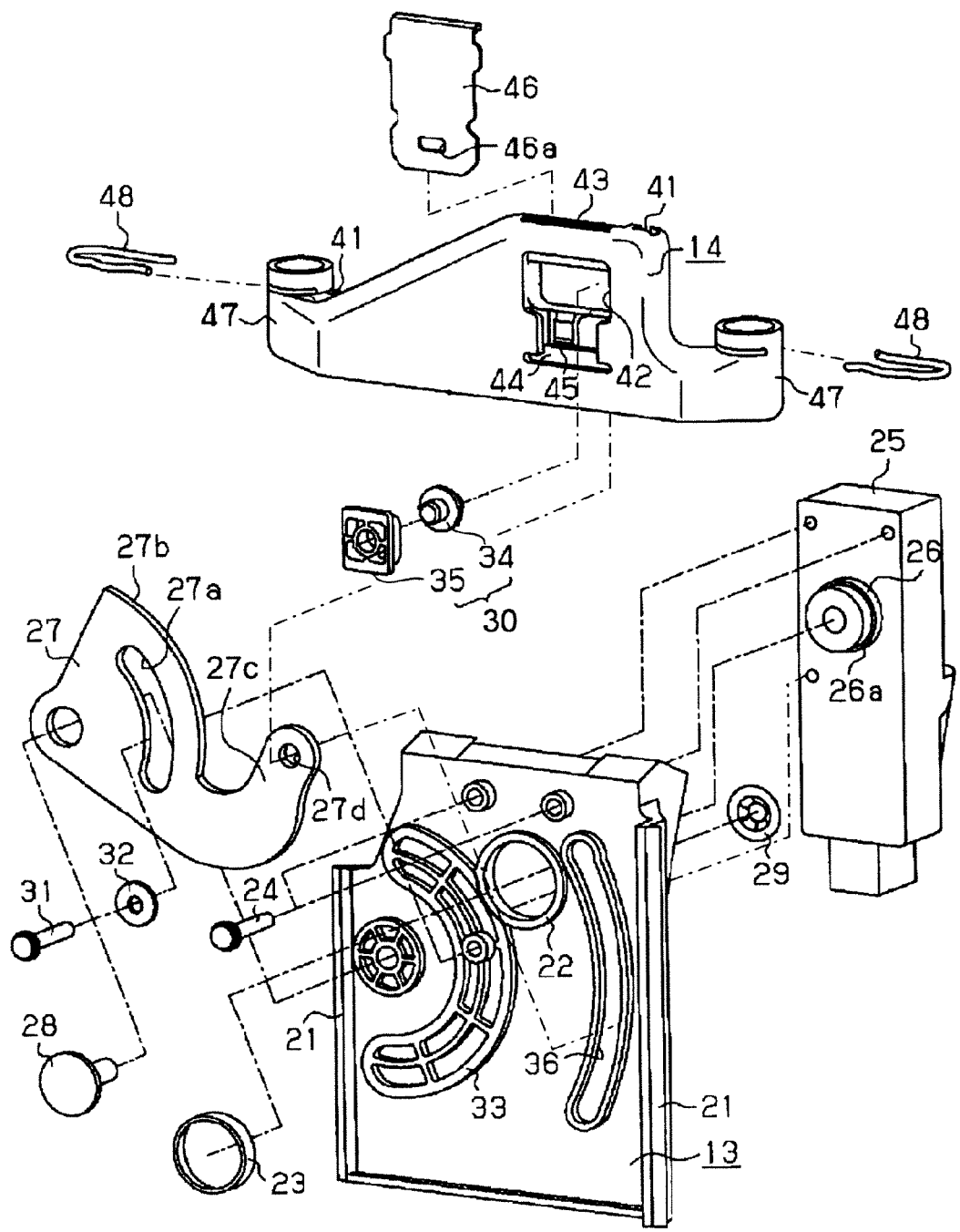
FIG. 5 is an exploded perspective view illustrating the headrest height adjusting apparatus.

More particularly, as illustrated in FIG. 5, the basal member 13 includes a pair of guide portions 21 at its both ends in the width direction and a supporting wall 22 formed at its width-directional central portion. The guide portions 21 extend in the up-and-down direction of the headrest 4. The supporting wall 22 has a circular shaped opening and is fittedly mounted therein with a cylindrically shaped bearing bush 23 of which outer diameter is substantially identical to an inner diameter of the supporting wall 22. An actuator 25, which serves as a driving source, is secured to the basal member 13 by bolts 24, and an output shaft 26 of the actuator 25 is rotatably inserted into the bearing bush 23. The output shaft 26 is formed with a spur gear 26a at a distal end protruding out of the bearing bush 23 (supporting wall 22). The actuator 25 is a part of the driving member and houses, therein an electric motor and a speed reduction mechanism. Rotational speed of the electric motor is reduced by the speed reduction mechanism and the reduced speed is outputted from the output shaft 26. The actuator 25 is electrically connected to a controller (not illustrated) that controls an operation of the actuator 25.

A sector gear 27, which is an approximately fan-shaped rotational member, is rotatably supported by a hinge pin 28 between the supporting wall 22 and the guide portion 21 at one side (left side in FIG. 5) of the basal member 13. The sector gear 27 is prevented from falling out, as washer 29 is attached to a distal end of the hinge pin 28 penetrating the basal member 13. Formed at the sector gear 27 is a guide bore 27a that is of arc-like shape around the hinge pin 28. A bolt 31 is inserted into the guide bore 27a via a washer 32. A distal end of the bolt 31, which extends through the guide bore 27a, penetrates the basal member 13 and is fastened to the actuator 25. The bolt 31 guides the sector gear 27 to pivot about the hinge pin 28 relative to the basal member 13. The basal member 13 is formed with a land 33 that is of arc-like shape and protrudes against the guide bore 27a and a peripheral area of the guide bore 27a. The land 33 acts as a seating surface of the sector gear 27 slidably movable relative to the basal member 13.

The sector gear 27 further includes a toothed portion 27b, which is formed at an outer periphery thereof and is engageable with the spur gear 26a of the output shaft 26, and an arm portion 27c, which is successively formed at a bottom end of the toothed portion 27b and extends outwardly in a radial direction. The toothed portion 27b can be a spur gear. The arm portion 27c is formed with a bore 27d at an end thereof, and a body part 35 is rotatably supported at the arm portion 27c via a pin 34 (supporting member) that extends through the bore 27d and is a metal-made core. The core known as the pin 34 does not plastically deform. Further, the core known as the pin 34 serves as a main part for transmitting driving force of the actuator 25 to the movable member 14. The body part 35 can be molded to an approximately four-sided polygonal frame from an elastic resin material such as Hytrel® that is a resin excelling in an elastic property in a compression direction. The pin 34 and the body part 35 structure a bush 30 serving as a transmitting member and a sliding member.

The basal member 13 is further formed with a stroke restraint 36 that is a recess of arc-like shape around the hinge pin 28. The stroke restraint 36 houses therein a distal end of the pin 34 extended through the bore 27d of the arm portion 27c and allows a pivot-rotational movement of the sector gear 27 relative to the basal member 13 until the distal end of the pin 34 comes in contact with an inner surface of one or the other side wall of the stroke restraint 36 in a circumferential direction of the stroke restraint 36.

Laterally spaced guided portions 41 are formed at the movable member 14 and are mated with the guide portions 21 of the basal member 13. The guided portions 41 are lifted up and down relative to the basal member 13 so as to be guided by the guide portions 21. A long hole 42 of approximately rectangular-shape is formed at a laterally central portion of the movable member 14 and has an open shape in a thickness direction. The long hole 42 possesses a vertically opening length corresponding to an outer profile of the body part 35, and the body part 35 is attached to the long hole 42 and is supported thereby so as to slide in the width direction of the long hole 42, i.e., in the longitudinal direction. Therefore, when the pin 34 and the body part 35 are moved as one unit in response to a pivotal rotation of the sector gear 27, the body part 35 is lifted up and down while sliding in the width direction of the long hole 42, and thus the movable member 14 is lifted up and down integrally with the body part 35. The long hole 42 is transmitted with a driving force of the driving member (actuator 25) via the body part 35 so as to serve as an input member of the movable member 14.

Figure 3:
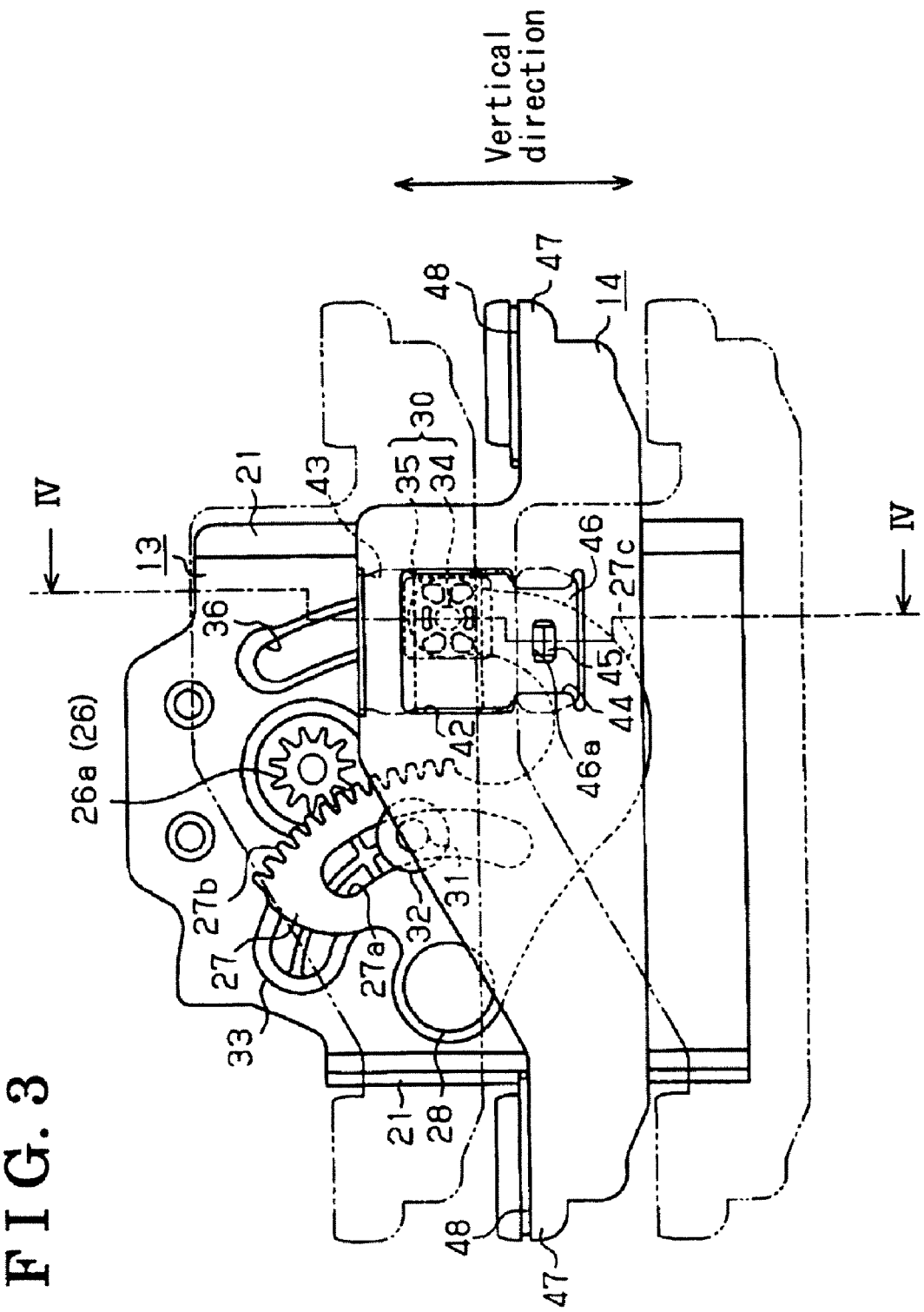
FIG. 3 is a front view illustrating the headrest height adjusting apparatus.

Further, the movable member 14 further includes a mounting hole 43 and a mounting groove 44. The mounting hole 43 is defined at an upper side of an opening end at one side (front side) of the long hole 42, and the mounting groove 44 is defined at a lower side of the opening end at the one side (front side) of the long hole 42. Both the mounting hole 43 and the mounting groove 44 communicate with the long hole 42 in the vertical direction. A latch tab 45 is formed integrally at a width-directional central portion of the mounting groove 44. The body part 35 and the pin 34 (bush 30), which are assembled to the long hole 42, are prevented from falling out forward by a covering plate 46 that is a metal plate fittedly mounted to the mounting hole 43 and the mounting groove 44 and covers an opening at the one side (front side) of the long hole 42. The covering plate 46 includes an engagement bore 46a at its lower end and is fixedly mounted on the movable member 14 (see FIG. 3) with the latch tab 35 latched with the engagement bore 46a.

The movable member 14 includes cylindrical tubular holders 47. Each holder 47 has a circular-shaped opening, of which axis extends in the up-and-down direction of the headrest 4. Each holder 47 is fitted therein with the end of the stay 12 inserted into the support 11b (see FIG. 2). Each end of the stay 12 is prevented from falling out of each holder 47 by a corresponding lock pin 48 (see FIG. 5).

In the headrest adjusting apparatus with the above-described structure, when the output shaft 26 is rotated in response to an actuation of the actuator 25, rotational movement of the spur gear 26a is transmitted to the sector gear 27 (toothed portion 27b) being gear-meshed with the spur gear 26a, thus the sector gear 27 rotates about the hinge pin 28. Accordingly, an arcuate motion of the arm portion 27c around the hinge pin 28 is generated.

In response to the arcuate motion of the arm portion 27c around the hinge pin 28, the bush 30 attached to the arm portion 27c is lifted up and down while slidably moving along the long hole 42 in the width direction. That is, although the arcuate motion (rotational movement) of the arm portion 27c includes movements in the width and up-and-down directions, the movements in the width direction are absorbed in accordance with the slidable movement of the bush 30 at the long hole 42 and only the movement in the up-and-down direction is transmitted to the movable member 14. As a result, the movable member 14 is lifted up and down and the headrest 4, which is linked to the movable member 14 via the stay 12, is also lifted up and down as one unit with the movable member 14.

Figure 4:
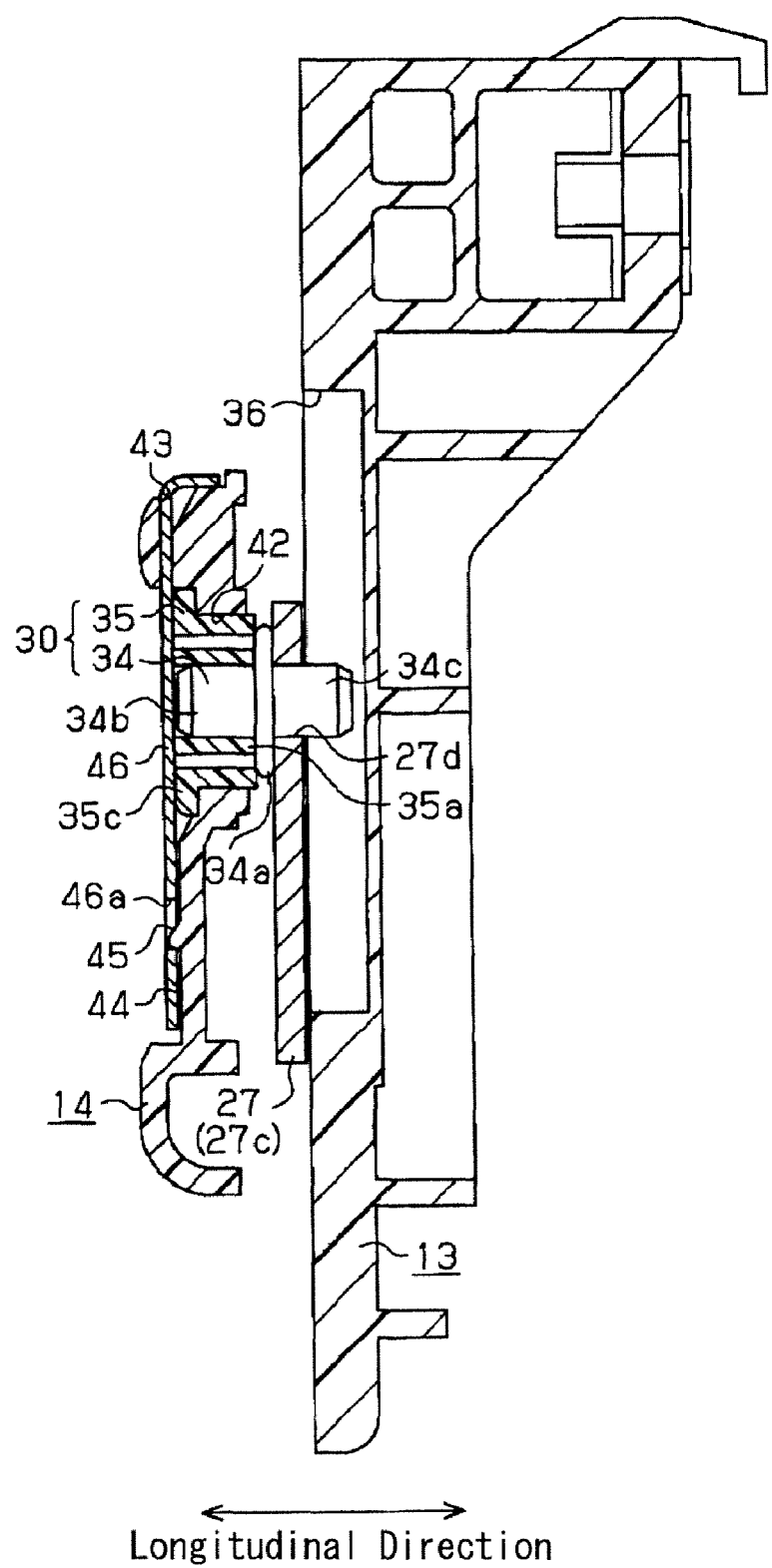
FIG. 4 is a sectional view taken along line IV-IV in FIG. 3.

Described below is the bush 30 with reference to FIG. 4 and FIG. 6. As shown in FIG. 4, the pin 34 includes a flange 34a at its axially central portion, a first pin 34b protruding to the one side (front side) and a second pin 34c protruding to the other side (rear side). The second pin 34c is inserted into the bore 27d of the arm portion 27c until the flange 34a of the pin 34 reaches or comes in contact with the sector gear 27. One end of the second pin 34c inserted through the bore 27d is housed in the stroke restraint 36. That is, the axial position of the second pin 34c partially overlaps the axial position (longitudinal direction) of the stroke restraint 36, and thus the rotational movement of the arm portion 27c (sector gear 27) relative to the basal member 13 is limited within a range before the end of the second pin 34c comes in contact with the inner surface of one or the other wall in a circumferential direction of the stroke restraint 36. It is obvious that the movement range of the movable member 14 in the up-and-down direction, i.e., the elevating range of the headrest 4 is limited in association with the limitation of the rotational range of the sector gear 27.

The first pin 34b is inserted into a cylindrical insert hole 35a formed at the central portion of the body part 35. Further, as illustrated in FIG. 6, the insert hole 35a is connected to an outer peripheral portion 35c of approximately four-sided cylindrical shape via multiple extensions 35b extending radially. The outer peripheral portion 35c forms an outer shape of the body part 35. According to the embodiment, the body part 35 includes six extensions 35b. The extensions 35b defining spaces between the insert hole 35a and the outer peripheral portion 35c serve as frangible portions of the body part 35 (bush 30). This body part 35 is attached into the long hole 42 of the movable member 14 and is prevented from dropping out of the movable member 14 by the covering plate 46, as described above.

As illustrated in FIG. 4, the body part 35 and the movable member 14, which are connected to the sector gear 27 via the pin 34, are positioned at an opposite side to the sector gear 27 and the basal member 13 relative to the flange 34a. Thus, the body part 35 and the movable member 14 are prevented from interfering or contacting with the sector gear 27 and the basal member 13. An axial position of the first pin 34b overlaps an axial position of the long hole 42. That is, the first pin 34b, which is metal-made and has high rigidity, faces the long hole 42, structuring the input member, in the up-and-down direction of the movable member 14.

It is assumed here that a head of an occupant impacts the headrest 4 for example during a vehicle collision. In a rear collision, a head of an occupant seated on the seat 1 can impact the headrest 4, while, in a front collision, a head of an occupant seated on a rear seat of the vehicle can impact the headrest 4. Here, movements of the impact load in the longitudinal direction are supported by the supports 11b of the seatback frame 11. Movements of the impact load in the up-and-down direction are, however, applied to the movable member 14 via the stay 12. The movable member 14 is received by the arm portion 27c of the sector gear 27 via the bush 30, which structure retains the movable member at its current height.

When the movable member 14 is applied with the vertical movements of the impact load above a certain load level, the body part 35 distorts or collapses with the extensions 35b plastically deformed, thus distortion or collapse absorbs energy generated due to the impact. Therefore, it is possible to prevent the impact energy from being transmitted directly to the driving member such as the sector gear 27, the basal member 13 and the movable member 14.

As described above, because the metal-made pin 34 (first pin 34b) overlaps the long hole 42 of the movable member 14 in the longitudinal direction, even if the body part 35 distorts or breaks completely, the movable member 14 is supported by the pin 34, and thus the movable member 14, i.e., the headrest 4 is maintained within a certain height range.

As described above, the following effects are obtained according to the embodiment.

(1) According to the embodiment, when an impact is applied at a remarkably high level in the elevating direction of the headrest 4 between the sector gear 27 (driving member) and the movable member 14, the body part 35 is collapsed with the extensions 35b elastically deformed, which collapse absorbs the impact energy. Therefore, it is possible to prevent the impact energy from being transmitted directly to the driving member, the basal member 13 and the movable member 14. Accordingly, it is possible to restrain possible damages to the basal member 13 and/or the movable member 14 and to maintain the headrest 4 appropriately. Further, because those possible damages to the basal member 13 and the movable member 14 are restrained, the basal member 13 and/or the movable member 14 can be made of resin and are therefore lighter.

(2) According to the embodiment, the body part 35 distorts or collapses in response to an impact, which is applied to the sector gear (driving member) and the movable member 14 in the up-and-down direction of the headrest 4. In such circumstances, at least the pin 34, which is made of a metal and has high rigidity, maintains its shape. Therefore, the movable member 14, which faces the pin (first pin 34b) along the long hole 42 in the vertical direction, is maintained within a certain range of height. In other words, the headrest 4 is maintained within a certain range of height.

(3) According to the embodiment, the frangible portion of the body part 35 (bush 30), which is associated to absorb an impact energy, is structured by connecting the insert hole 35a to the outer peripheral portion 35c by the extensions 35b extending radially. Therefore, the frangible portion is supplied by molding the body part 35 by a simple way.

(4) According to the embodiment, the bush 30 slides along the long hole 42 and converts a rotational movement of the sector gear 27 to a linear motion. Therefore, it is possible to employ, as the actuator 25, a simple-structural motor that generates rotational force, which reduces the manufacturing time. The motor can be a DC brush motor, a motor that has a DC brush motor with a speed reduction mechanism, or the like.

(4) According to the embodiment, the bush 30, which transfers or converts a mechanical motion, is also employed to absorb energy. In this case, compared with a case in which an exclusive component is added for absorbing energy, the number of components is reduced.

The above described embodiment can be modified as follows. The transmitting member is not limited to the member (bush 30), which is associated to conversion of a rotational movement to a linear movement. For example, in case where a so called thrust actuator, which can directly obtain driving force of a linear movement of a linear motor, a linear solenoid and so on, is employed as the driving member, the transmitting member can be a member that transmits this driving force of the linear movement to the movable member.

The pin 34 can be molded integrally with the body part 35 for example by an insertion molding. The above-described material of the body part 35 is one of examples.

The above-described frangible portion of the bush 30 is one of examples. For example, the frangible portion is structured by cutting into the bush (main part) of block-shape. The basal member 13 can be formed integrally with the seatback frame 11.

The movable member 14 can be formed integrally with the stay 12 (or headrest 4). Controlling of the actuator 25 by a controller, i.e., controlling of the height of the headrest 4 can be performed on the basis of an operation of an occupant or in association with an adjustment of the seat cushion 2 in the longitudinal direction.

When a remarkably large impact is applied in the vertical direction between the driving member and the movable member, collapse of the transmitting member is introduced at the frangible portion so that energy of the impact is absorbed. Therefore, it is possible to prevent the impact energy from transmitting directly to the driving member, the basal member and the movable member. Possible damages against the basal member or the movable member are restrained and the headrest is maintained appropriately. Further, because possible damages against the basal member or the movable member are restrained, for example the basal member or the movable member can be a resin molding, which leads to reduction in weight.

As described above, the transmitting member further includes: a body part, which is engaged with an input member of the movable member and transmits driving force of the driving member to the input member; and a metal-made core, which is inserted into the body part and faces the input member in the vertical direction.

As described above, the body part is made of resin having elasticity. When the transmitting member (body part) collapses due to an impact applied in the vertical direction between the driving member and the movable member, at least the metal-made core, which has high rigidity, can maintain its shape. Therefore, the movable member, which faces the core at the input member in the vertical direction, is retained within a certain height range. That is, the headrest is retained within a certain height range.

The body part includes an insert hole, into which the core is inserted, and an outer peripheral portion that is engaged with the input member, and the frangible portion is an extension that extends in a radial direction and connects the insert hole and the outer peripheral portion.

Therefore, it is possible to provide the frangible portion at the transmitting member by easily molding the body part.

As described above, the driving member includes a driving source and a rotational member, which is rotatably supported by the basal member and is rotatably operated by the driving source, and the transmitting member is a sliding member, which is connected to the rotational member and is arranged at a long hole formed at the movable member, the sliding member converts a rotational movement of the rotational member to a linear movement while sliding on the long hole so that the headrest linked to the movable member is lifted up and down.

In this case, a motor, which is simply structured and generate rotationally force, is employed as the driving source, which reduces a manufacturing time. Further, the headrest height adjusting apparatus includes: a supporting member supporting the movable member when the transmitting member collapses.

As described above, it is possible to provide a headrest height adjusting apparatus, which can maintain a headrest appropriately in a collision and can be reduced in weight.

The present invention is applicable to a seat for a vehicle in which a seatback is fixed to a seat cushion at a predetermined angle. The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A headrest height adjusting apparatus comprising:
a basal member to be attached to a seatback and supporting a driving member:
a movable member linked to a headrest and lifted up and down relative to the basal member: and
a transmitting member transmitting a driving force of the driving member to the movable member and lifting up and down the headrest linked to the movable member, the transmitting member having a frangible portion that leads to a collapse of the transmitting member in response to an impact applied in a vertical direction between the driving member and the movable member and absorbs energy of the impact,
wherein the transmitting member further includes: a transmitting member body engaged with an input member of the movable member and transmitting the driving force of the driving member to the input member,, and a metal-made core, which is inserted into the body part, facing the input member in the vertical direction.

2. A headrest height adjusting apparatus according to claim 1, wherein the transmitting member body is made of resin having elasticity.

3. A headrest height adjusting apparatus according to claim 2, wherein the transmitting member body includes an insert hole, into which the metal-made core is inserted, and an outer peripheral portion engaged with the input member, and the frangible portion is an extension extending in a radial direction and connecting the insert hole and the outer peripheral portion.

4. A headrest height adjusting apparatus according to claim 3, wherein the driving member includes a driving source and a rotational member, rotatably supported by the basal member and rotatably operated by the driving source, and the transmitting member is a sliding member, connected to the rotational member and arranged at a long hole formed at the movable member, the sliding member converts a rotational movement of the rotational member to a linear movement while sliding on the long hole so that the headrest linked to the movable member is lifted up and down.

5. A headrest height adjusting apparatus according to claim 2, wherein the driving member includes a driving source and a rotational member, rotatably supported by the basal member and rotatably operated by the driving source, and the transmitting member is a sliding member, connected to the rotational member and arranged at a long hole formed at the movable member, the sliding member converts a rotational movement of the rotational member to a linear movement while sliding on the long hole so that the headrest linked to the movable member is lifted up and down.

6. A headrest height adjusting apparatus according to claim 1, wherein the transmitting member body part includes an insert hole, into which the metal-made core is inserted, and an outer peripheral portion that-is engaged with the input member, and the frangible portion is an extension extending in a radial direction and connecting the insert hole and the outer peripheral portion.

7. A headrest height adjusting apparatus according to claim 6, wherein the driving member includes a driving source and a rotational member, rotatably supported by the basal member and rotatably operated by the driving source, and the transmitting member is a sliding member, connected to the rotational member and arranged at a long hole formed at the movable member, the sliding member converts a rotational movement of the rotational member to a linear movement while sliding on the long hole so that the headrest linked to the movable member is lifted up and down.

8. A headrest height adjusting apparatus according to claim 1, wherein the driving member includes a driving source and a rotational member, rotatably supported by the basal member and rotatably operated by the driving source, and the transmitting member is a sliding member, connected to the rotational member and arranged at a long hole formed at the movable member, the sliding member converts a rotational movement of the rotational member to a linear movement while sliding on the long hole so that the headrest linked to the movable member is lifted up and down.

9. A headrest height adjusting apparatus comprising:
a basal member to be attached to a seatback and supporting a driving member:
a movable member linked to a headrest and lifted up and down relative to the basal member: and
a transmitting member transmitting a driving force of the driving member to the movable member and lifting up and down the headrest linked to the movable member, the transmitting member having a frangible portion that leads a collapse of the transmitting member in response to an impact applied in a vertical direction between the driving member and the movable member and absorbs energy of the impact.
wherein the driving member includes a driving source and a rotational member, rotatably supported by the basal member and rotatably operated by the driving source, and the transmitting member is a sliding member, connected to the rotational member and arranged at a long hole formed at the movable member, the sliding member converts a rotational movement of the rotational member to a linear movement while sliding on the long hole so that the headrest linked to the movable member is lifted up and down.

10. A headrest height adjusting apparatus comprising:
a basal member to be attached to a seatback and supporting a driving member;
a movable member linked to a headrest and lifted up and down relative to the basal member;
a transmitting member transmitting a driving force of the driving member to the movable member and lifting up and down the headrest linked to the movable member, the transmitting member having a frangible portion that leads a collapse of the transmitting member in response to an impact applied in a vertical direction between the driving member and the movable member and absorbs energy of the impact; and
a supporting member supporting the movable member when the transmitting member collapses.

* * * * *